No. 846,537. PATENTED MAR. 12, 1907.
D. WHITEFORD.
ANTISIPHON DRAINAGE TRAP.
APPLICATION FILED APR. 1, 1905.
FIG. 1.
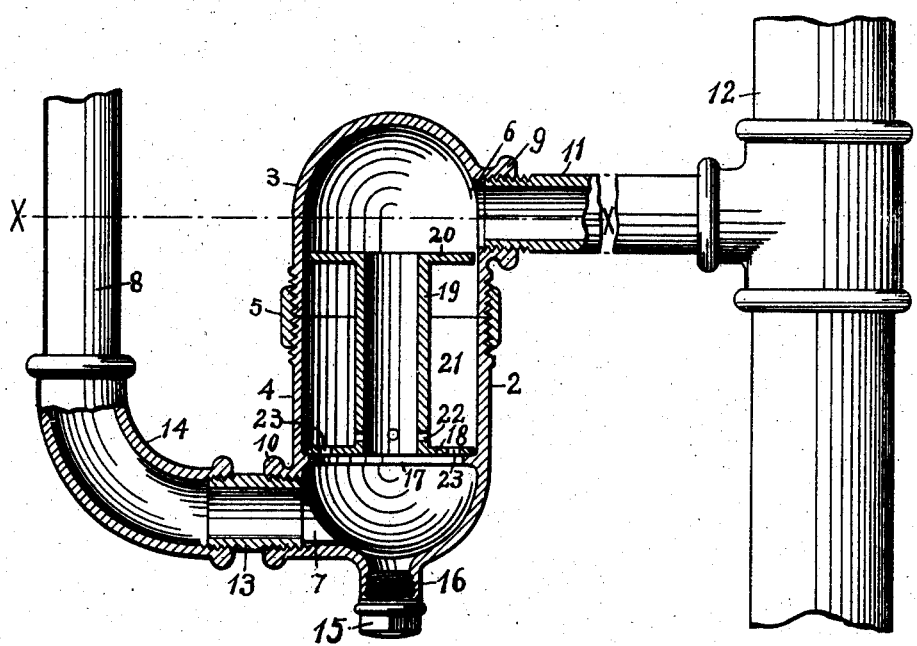
FIG. 2.
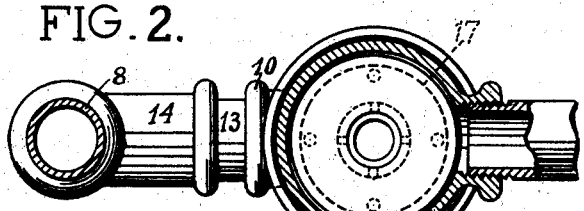
FIG. 3.
FIG. 4. FIG. 5.
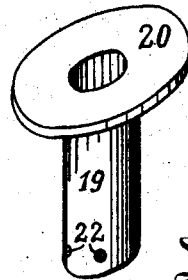
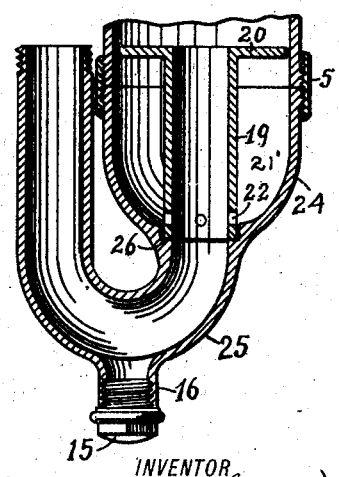
WITNESSES:
Fred. L. Kohler.
Israel L. Landis
INVENTOR
David Whiteford
BY
J. Warner Peckstrom
ATTORNEY

UNITED STATES PATENT OFFICE.

DAVID WHITEFORD, OF CHICAGO, ILLINOIS.

ANTISIPHON DRAINAGE-TRAP.

No. 846,537.  Specification of Letters Patent.  Patented March 12, 1907.

Application filed April 1, 1905. Serial No. 253,350.

*To all whom it may concern:*

Be it known that I, DAVID WHITEFORD, a citizen of the United States, residing at Chicago, in the county of Cook and State of Illinois, have invented certain new and useful Improvements in Antisiphon Drainage-Traps, of which the following is a specification.

This invention relates to drainage-fittings, and has particular reference to stench-traps. The object of the invention is to provide a trap which will in a simple, economical, and efficient manner protect its water seal against siphoning and without the aid of the unsightly and frequently insanitary vent-pipes commonly employed, and thereby eliminate an important item of cost of construction and a source of danger to health.

The invention consists in the combination with a trap-chamber or drainage-conduit of a trap of an auxiliary chamber or pocket communicating with said chamber or conduit and constructed to impede drainage thereof into the trap proper when the seal in the latter has been siphoned out.

The invention further consists in a trap-chamber having an inlet and an outlet and a pocket or auxiliary chamber arranged between said inlet and outlet to receive a portion of the flow through said trap.

The invention further consists in a trap constituting a section of conduit, said trap having at least a portion of said conduit surrounded by a pocket or auxiliary chamber arranged to receive and deliver a portion of the fluid flowing through said conduit at a rate of flow substantially retarded relatively to the rate of flow through said conduit.

The invention further consists in a trap-chamber having an inlet and an outlet and an open channel therebetween, at least a portion of said channel being surrounded by a space adapted to retain a body of liquid in a comparatively quiescent state during a flow of liquid through said channel.

The invention further consists in the combination with a trap-chamber of a removable wall of tubular form providing a section of channel through which liquid may flow and a partition between said tubular wall and the inner wall or walls of the trap-chamber, whereby an auxiliary chamber is provided, the latter having a comparatively small opening or several thereof leading to the path of flow through said chamber; and the invention further consists in the additional novel features and construction hereinafter described in detail, illustrated in the drawings, and pointed out in the claims.

In the drawings, which form a part of this specification, Figure 1 represents a vertical section through a trap embodying my invention. Fig. 2 is a horizontal section taken substantially on line X X of Fig. 1. Fig. 3 is a vertical section of the lower portion in modified form, part of the upper portion being broken away. Fig. 4 is a perspective view of the interior partition or flanged tube shown in Fig. 1. Fig. 5 is a similar view of the modified form of partition or flanged tube shown in Fig. 3.

Referring to the drawings, 2 represents the drum or body of the trap, and said body is made in two sections—the upper section 3 and the lower section 4—herein shown as secured together by means of a sleeve 5, having threaded engagement with complemental threads on abutting ends of sections 3 and 4. Any other suitable form of joint may be employed for securing said sections together, and its details are therefore not material. I prefer to make the joint below the top level of the water seal, as shown, so that if the junction is made imperfect through carelessness or accident it may be discovered through leakage of water and in any event protected against a reflex passage of gases by the water seal. If preferred, however, a cap may be placed above the outlet, hereinafter referred to. Branches 9 and 10 for respectively the outlet 6 and inlet 7 provide connections with the soil-pipe 12 and sink or other drain-pipe 8. The branch 9 is connected with the drain-pipe 12 through a pipe 11, and any suitable union commonly employed may be provided. I have shown a nipple 13 connecting the body of the trap with a bend 14, which in turn is connected with the drain-pipe 8. In the bottom of the drum or body 2 is shown the usual threaded opening 16 and a plug 15, which may be removed to clean the trap.

Within the drum 2, Fig. 1, and immediately above the inlet is an annular ridge or ledge 17, upon which is supported the lower flange 18 upon a short tube 19. A similar flange 20 surrounds the upper end of the tube. Said tube and flanges have substantially the appearance of a spool with a hollow core. The bore of tube 19 is preferably the same as that of the inlet and outlet to provide a free passage through the trap for the sewage. Between tube 19 the inner wall or walls of the drum 2 and the flanges 18 and 20 is a pocket 21, surrounding tube 19. If the bore of pipes 8 and 11 and the tube 19 is, say, two inches in diameter, the drum or body 2 may be made about three inches in diameter, which would ordinarily make the capacity of pocket or auxiliary chamber 21 sufficient to hold a volume of water that will provide an ample seal after the pipes and tube have been siphoned empty. Limited communication between the auxiliary chamber and trap-chamber proper is provided by one or more holes or openings 22, which may be made in the lower end of tube 19, or openings 23 may be formed in the lower flange 18. If desired, openings may be made in both flange and tube, and their capacity should be such as to admit fluid readily and yet not permit but a comparatively small portion to escape during the momentary rush of air taking place after the trap has been emptied.

In Fig. 3 I have shown a modification wherein the lower section 4 of Fig. 1 takes the form of a lower section 24, provided with an integral pipe-bend 25, which carry the parts 15 and 16. The tube 19 applied to section 24 is shown minus the lower flange 18, and the lower end of the tube is supported upon an annular shoulder 26, formed by a corresponding recess in the bottom of section 24. Other modifications may be made without departing from the spirit of the invention, the full scope of which is pointed out in the appended claims.

The operation of my invention is as follows: During ordinary drainage when small quantities of waste fluid is emptied into the pipe 8 the trap will be always full of liquid up to the outlet 6, including the pocket 21. When a larger quantity of sewage or water is emptied through the trap and connected pipes, the pocket or auxiliary chamber 21 will be kept filled with liquid so long as there is a flow through the trap. If the volume of flow through the outlet-pipe is sufficient to cause siphonage, the trap will be emptied during the fall of water beyond the outlet 6, which takes place usually within one or two seconds of time. The upper flange and the tube will then keep the water or waste imprisoned and protected against suction through tube 19, save for the slight leakage that may take place momentarily, until the siphoning action ceases, when the liquid will flow from the chamber 21 into the bottom of the trap and bend 13 or the bend 25, as the case may be, closing the trap against a reflex passage of air or gas. Ordinarily the trap will be filled up to the outlet 6 by small quantities of drainage not sufficient to fill the outlet-pipe and cause suction or a partial vacuum in the trap; but if, immediately after the trap has been siphoned empty, so far as the main channel is concerned, a sufficient quantity of liquid is drained to again cause siphonage the chamber 21 will be filled with liquid during the flow prior to the final suction when the openings 22 23 are of proper size. Actual tests have demonstrated that no especial care need be exercised in determining the gage of these openings, however.

If the trap chamber or chambers should become clogged with solid matter, the inner partition may be easily removed by separating the upper and lower sections, when the interior of the trap is made as open as an ordinary cup and may be as easily cleaned. Said sections are substantially a pair of cups secured together at their edges, and the tube 19 and its flanges are partition-walls within the two cups separating the interior space into an inner and an outer chamber, the inner chamber being the conduit between the openings 6 and 7 and the outer chamber the space 21. It is of course immaterial what form these flanges and tube take and whether they are joined together as an integral member, as shown, or assembled separately within the trap-chamber so far as the spirit of the invention is concerned.

Having thus described my invention, I claim as new and desire to secure by Letters Patent—

1. In a drainage-trap, the combination with the trap-chamber, of a tube arranged in the path of flow through said chamber, said tube having flanges which serves as a partition-wall between said tube and the wall or walls of said trap-chamber, said tube and flanges together providing an inclosure surrounding the path of flow through said trap-chamber, said inclosure being partly open to said path in such a manner that liquid will flow by gravity from said tube into said trap-chamber.

2. In a drainage-trap, the combination with the trap-chamber, of a tube of less diameter than the interior of said chamber, means for partly closing the space between said tube and the wall or walls of said chamber to provide an auxiliary chamber which encircles the path of flow through said trap-chamber and permits liquid to drain by gravity from said tube into said trap-chamber.

3. The combination, in a drainage-trap, of an inner chamber and an outer chamber, said inner chamber serving as a conduit between the inlet and outlet openings of said trap, and removable walls between said chambers.

4. In a drainage-trap, the combination of an upper and a lower section, each section being substantially cup-shaped, removable partition-walls within said sections, which provide, respectively, a conduit between the openings into and from said trap and a partially-closed chamber surrounding said conduit, and means for securing said sections together.

5. In a drainage-trap, in combination a trap-body consisting of upper and lower sections such as 3 and 4 or 24, the upper section provided with the outlet 6 and the lower section provided with the inlet and trap-space comprising bottom portion of the lower section and the parts 13 and 14, or an equivalent such as 25, said trap-space provided with the opening 16 normally closed by the plug 15, and the tube 19 in combination with intersecting walls arranged to provide the pocket or auxiliary chamber 21 or 21'.

6. A drainage-trap comprising upper and lower sections and means for securing said sections together separably, the upper section having therein an outlet-opening 6, the lower section having an inlet-opening 7 and the curved trap-space proper connecting the body of the trap with the drain-pipe 8, the tube 19 and the intersecting walls which, together with said tube, provide the pocket or auxiliary chamber surrounding said tube, said chamber having an opening, or several openings, communicating with the path of flow through said trap.

In testimony whereof I have hereunto set my hand in the presence of two subscribing witnesses.

DAVID WHITEFORD.

Witnesses:
    FRED. L. KOEHLER,
    J. W. BECKSTROM.